(No Model.)
M. S. REXFORD.
ROAD SCRAPER.
No. 424,823. Patented Apr. 1, 1890.
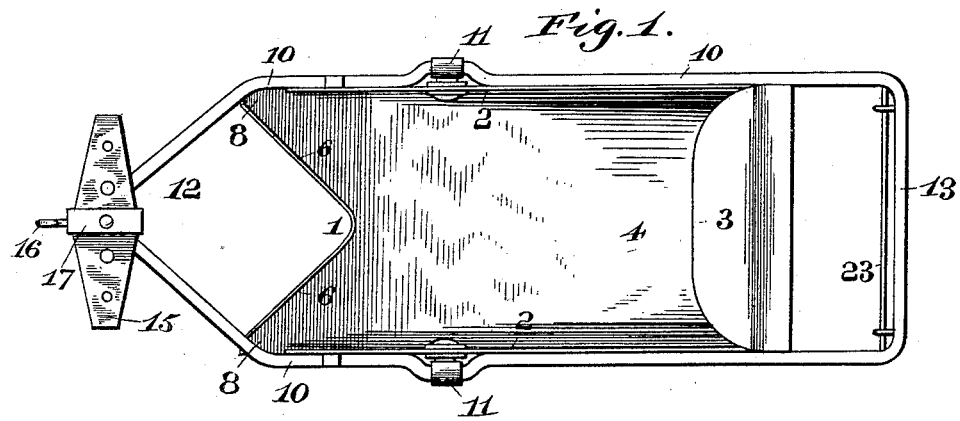
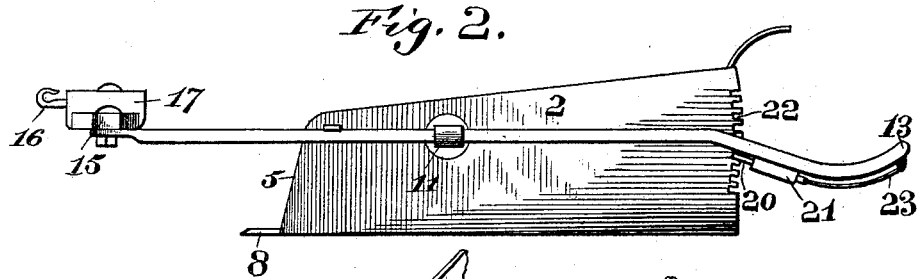
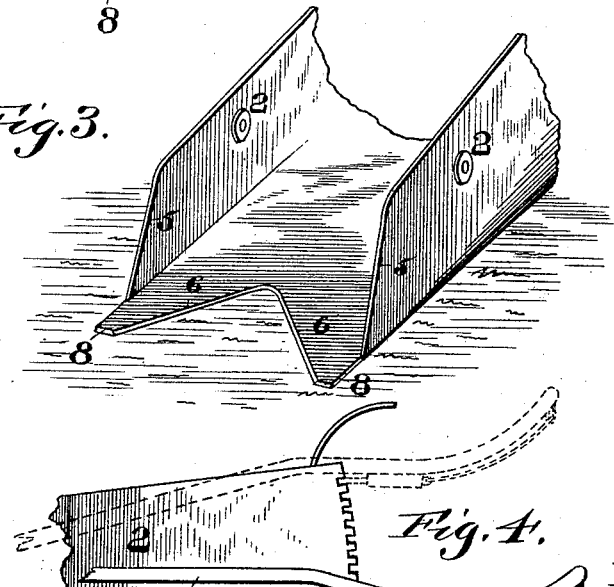
Witnesses:
Inventor.
M. S. Rexford
By his Attorneys
Edson Bros.

UNITED STATES PATENT OFFICE.

MORTIMER S. REXFORD, OF NORMAN, (DAKOTA TERRITORY,) NORTH DAKOTA.

ROAD-SCRAPER.

SPECIFICATION forming part of Letters Patent No. 424,823, dated April 1, 1890.

Application filed November 29, 1889. Serial No. 331,882. (No model.)

*To all whom it may concern:*

Be it known that I, MORTIMER S. REXFORD, a citizen of the United States, and a resident of Norman, in the county of Cass and State of North Dakota, have invented certain new and useful Improvements in Road-Scrapers; and I do hereby declare the following to be a full, clear, and exact description of the invention, such as will enable others skilled in the art to which it appertains to make and use the same.

My invention relates to improvements in road-scrapers; and it has for its objects, first, to provide an improved scraper adapted to cut through the ground with ease and to gather or accumulate all the loose earth in its path; second, to provide means whereby the depth of the cut can be readily and easily regulated, and, finally, to improve the scraper so that it can be easily and quickly manipulated to dump the load, and is simple, durable, and strong in construction and cheap of manufacture.

With these and other ends in view, my invention consists of a scraper having the front open end thereof constructed or fashioned to form cutters which act in a manner similar to a common plow—that is to say, the vertical side wall of the scraper is inclined and sharpened and the bottom provided with a recess, the apex formed by the inclined sides of which recess is at the longitudinal center of the scraper, the vertically-inclined edge of the side and the inclined edge of the recess on one side of the scraper constituting one cutting part, while the corresponding inclined edges on the other half of the scraper form the other cutting part. The earth turned up by these cutters is gathered or accumulated in the body of the scraper, and the scraper is formed with rounded or curved sides to enable the body of the scraper to be readily turned or rolled over to discharge the load. To the body of the scraper, at a point intermediate of the length thereof, are pivoted the side bars or rods of a longitudinal bail, which bail is arranged on the outside of the scraper, and is of sufficient length to extend beyond both the rear and front ends of the scraper-body. The bars or sides of the bail at the front end of the implement are inclined to meet at a point in line with the center of the body of the scraper, and the front and rear ends of the bail are united together, the cross-bar at the rear end of the bail serving as the handle for guiding and manipulating the implement. The bail is provided at its front end with a fixed transverse draft-bar, on which is secured a longitudinal draft-hook, said hook being adjustable on the draft-bar in a line transversely at right angles to the length of the implement, and as the bail is pivoted on the scraper at a point intermediate of the length thereof the bail can be elevated or depressed in order to vary the depth of the cut of the scraper. The bail and scraper are detachably locked together by a locking device at the rear end of the scraper, which device is within convenient reach of the attendant and is mounted on the bail to engage teeth on the body of the scraper, all as will be hereinafter more fully described and claimed.

To enable others to understand my invention, I will now proceed to a detailed description thereof in connection with the accompanying drawings, in which—

Figure 1 is a plan view of my improved road-scraper; Fig. 2, a side elevation thereof. Fig. 3 is a detail perspective view of the front end of the scraper proper. Fig. 4 is a detail view of the locking means for detachably holding the bail and scraper in their adjusted positions.

Referring to the drawings, in which like numerals of reference denote corresponding parts in all the figures, 1 designates the scraper proper, which has the side walls 2, the end wall 3, and a bottom 4, which may be made either partially or wholly of sheet metal. The scraper is rounded or curved in cross-section to enable it to be readily turned or rolled over by the attendant in order to discharge the load, the curvature being formed at the line of juncture of the side walls with the bottom of the body of the scraper. The open front end of the scraper is constructed to provide two cutters for easily turning up the earth, and each cutter is formed by the vertical edge 5 of one of the side walls and the inclined edge 6 of the bottom of the scraper, these parts operating in a manner similar to that of an ordinary plow, in which the bottom of the scraper and the side wall of the scraper are the equivalents, respectively, of the mold-board and landside of the plow, as is readily apparent. The vertical front edge 5 of the side wall is inclined rearwardly from the bottom of the scraper toward the upper edge of said side wall, and the inclined edge 6 is inclined rearwardly from the side wall toward the longitudinal center of the scraper-body, the two edges 6 being inclined reversely to each other and meeting nearly in the longitudinal center of the body, forming a recess in the front end of the bottom, which is approximately V-shaped in form. At the juncture of each side wall with the bottom of the scraper I provide a forwardly-extending prong 8, which forms a continuation of the inclined edge 6, and is adapted, by reason of its narrow thin proportions, to easily penetrate the earth, and thus provide the way for the cutting-edges of the scraper to take into the earth with ease and facility.

10 designates the bail, which is arranged on the outside of the scraper and extends beyond the ends of the latter both at the front and rear. The longitudinal or side bars of the bail are pivotally connected to the scraper at a point intermediate of the length of the bail and body, as at 11, to adapt the bail to be adjusted vertically, and thus vary the relative position of the scraper to the bail to regulate the depth of the cut of the scraper. The front ends of the side bars of the bail are inclined, as at 12, toward each other, so as to meet in the longitudinal axis of the scraper, and at their rear ends said bars are joined by a transverse bar 13, which serves as the handle for the attendant to guide and manipulate the implement, the several bars of the bail being continuous and in one piece, although it is obvious that the bail may be made in separate pieces and suitably united together.

To the front end of the bail is rigidly secured a transverse bar 15, and on this bar is secured a draft hook or link 16, to which a clevis may be attached, in order to hitch the team to the implement, said draft-hook being inclosed within a case 17, which is detachably secured in the transverse bar, in order to adjust the draft-link on the bar in a line at right angles to the axis of the implement or line of draft.

The bail and scraper are securely locked together by suitable contrivances at the rear of the scraper within convenient reach of the attendant. In Fig. 4 I have illustrated one form of the locking appliance, which consists of the sliding spring-pressed bolts 20, mounted in suitable guides 21 on the side bars of the bail, and these bolts are normally forced by their springs toward the scraper to engage two of the series of teeth 22, formed in or secured to the rear end of the scraper at the sides thereof. These locking-bolts are connected by a common handle 23, that is suitably supported on the bail and is adapted to simultaneously withdraw the bolts from engagement with the teeth on the scraper by a single pull; but it is obvious that this particular form of locking appliance can be changed or modified without departing from the spirit of my invention.

The operation of my improved road-scraper may be briefly described as follows: The team is hitched to the draft hook or link on the transverse bar of the bail, and as the implement is drawn along the prongs and cutters enter the ground and turn up the earth. The loosened earth is gathered and accumulated in the body of the scraper, which can be readily inverted or turned over to discharge the load, owing to the rounded or curved contour of the scraper. If it is desired to increase the depth of the cut or degree of penetration of the scraper, the locking devices are withdrawn from engagement with the scraper and the front end of the bail is raised by turning the same on its pivots to the desired position, after which the bolts are released to again engage the scraper; but should it be desired to lessen the depth of the cut the front end of the bail is lowered and the scraper and bail locked together.

With a scraper constructed as herein described the material is not liable to escape from the body in descending a hill or declivity, and the latter will easily penetrate and pass through the ground, thus lessening the draft on the team.

I am aware that changes and alterations in the form and proportion of parts, as well as in the details of construction, can be made without departing from the spirit or sacrificing the advantages of my invention; and I would, therefore, have it understood that I reserve the right to make such changes and alterations as fairly fall within the scope of my invention.

Having thus fully described my invention, what I claim as new, and desire to secure by Letters Patent, is—

1. In a road-scraper, the combination of the body having the cutters at the front end thereof and the rounded sides to adapt said body to be turned laterally to discharge the load, a continuous bail arranged longitudinally of the body and pivotally connected thereto at a point intermediate of its length, a draft-bar secured to the apex of the bail, and locking devices for rigidly and adjustably locking the body and bail together at a point in rear of the pivotal connection between said body and bail, whereby the angular adjustment of the body with relation to the bail can be varied and the depth of penetration of the cutters regulated, as described.

2. In a road-scraper, a body having rounded sides and provided with the vertical and horizontal cutters at the front end thereof and with the rack-teeth at the rear end, in combination with a continuous bail pivoted to the body at a point intermediate of the length
5 thereof, a draft-bar secured to the apex of the bail, and the connected latches sliding in keepers on the bail at the rear end thereof, and adapted to engage the rack-teeth on the body, all combined and adapted for service substantially as described.

In testimony whereof I affix my signature in presence of two witnesses.

MORTIMER S. REXFORD.

Witnesses:
 M. LARSEN,
 C. B. CHRISTIANSON.